Patented Oct. 26, 1937

2,097,405

UNITED STATES PATENT OFFICE 2,097,405

MANUFACTURE OF BLEACHED PEPPER PRODUCTS

Lloyd A. Hall, Chicago, Ill., assignor to The Griffith Laboratories, Inc., Chicago, Ill., a corporation of Illinois No Drawing. Application January 24, 1935, Serial No. 3,313

6 Claims. (Cl. 99—230)

The present invention relates to bleaching of the naturally dark pepper products to make light colored pepper products commercially akin in color to so-called white pepper products. There are in nature two commercial types of peppers, and in commerce three types of pepper: black, red and white. The black and white peppers of commerce are derived differently from the same plant type, and the white is preferred where absence of color is desirable. The red pepper, commercially, is usually distinguished by the term "capsicum", and the black and the white generally by the term "pepper". The black pepper and the red pepper or capsicum are preferred for strength, aroma and flavor characteristics. The three peppers in general provide two distinctive condiment elements. "Aroma" is the volatile part and is commonly concentrated in extract form as oil of pepper. "Bite" is not of the volatile form and is commonly concentrated in an "oleoresin" form of the respective peppers. In preparing an oleoresin of the black or red pepper, color characteristics of the pepper are also concentrated with the flavoring material. Concentrated seasonings, such as are used in wholesale meat preparations, are compounded by use of varying proportions of either the essential oil to provide the aroma of pepper, or of oleoresin to provide the bite, which oleoresin may be with or without the aromatics, according to the type used.

The present invention is directed to the bleaching of oleoresins of pepper products to a lighter color, in such a way that desirable color characteristics of white pepper are obtained, and that advantageous flavoring characteristics of the red and black peppers are retained. It is more practical and equally possible to carry out the bleaching operations on the commercial concentrates or oleoresins in which color and bite are concentrated, with or without the aromatics, or the essential oil of pepper.

It is the general object of the present invention to bleach black or red pepper products to approach the color of white pepper products.

A particular object of the invention is the bleaching of a colored oleoresin of pepper from either black or red peppers, with a minimum destruction of the flavoring constituents contained in the oleoresin.

A further object of the invention is the regulation of the conditions and quantities of the materials involved in process in accordance with a desirable balance between end-color, end-strength, and end-flavor of the product.

A particular object of the invention is the use of a bleaching agent which is additive directly to the oleoresin to bleach without introducing factors requiring subsequent treatment of the immediate products of the bleaching reaction.

Another object is the use of benzoyl peroxide as the bleaching agent for oleoresins.

In describing the invention it will be illustrated by use of the oleoresins of capsicum and of black pepper, since these are the products on which the invention is most practiced and practical for the present day usages.

It is therefore to be understood that the invention is not limited to the details of usage and materials herein chosen to illustrate the nature of the invention and to explain the manner now preferred as the best way to practice the invention for the present requirements, or fancies of the trade.

It will be understood that in the extraction of pepper concentrates the vegetable fibers are treated with a volatile solvent, such as acetone, to separate the constituents including the "aroma" and the bite from the inactive fibrous or insoluble inactive portion of the vegetable mass. The solvent dissolves both the bite and the aroma. The solvent extract is distilled and the volatile solvent is removed, leaving a so-called "still residue" which is the oleoresin, containing the essential oil, or aroma, and the bite. In some cases, further treatment may be made to remove the essential oil. However, the commercial oleoresins, and the term oleoresin as generally used herein, contemplates that the aroma and the bite may both be present, but the invention applies equally well if the aromatics have been removed from the oleoresin.

In carrying out the bleaching, an oxidizing agent is employed, and many are available. Oxidizing agents are well known to vary in effectiveness according to conditions applied, material to be oxidized, material unavoidably exposed to oxidation, concentration of oxidant, and the character or degree of oxidation. Thus for a selected oxidizing agent suitable conditions must be developed. As to colored oleoresins of peppers, it has been discovered that the color ingredients can be made more subject to oxidation than the flavoring ingredients; also, that a desirable bleaching can be effected with little impairment in flavoring value. At the same time it has been learned that a high degree of bleaching may be accompanied by a considerable reduction in flavor value, both as to bite and aroma constituents.

Certain agents, such as those which are active in water solution necessitate recovering the product from water. Other agents which form by-products, may require removal of such by-products or of other materials resulting from side reactions of such by-products.

For these and other reasons I prefer to use an oxidizing agent which can act on the pepper base by direct addition to it, forming one or more by-products which can be left in the product as a harmless ingredient, and in some respects a beneficial ingredient. Organic peroxides, as a general class are of this type. Benzoyl peroxide is an example which alone, on heating, yields active oxygen, and forms benzoic acid.

Procedure A

The simple bleaching reaction between benzoyl peroxide and a colored oleoresin of pepper illustrates the points above discussed. One-half a pound of the liquid commercial oleoresin of black pepper is heated with intermittent agitation in glass refluxing apparatus to 160° F., at which temperature 3% of its weight of benzoyl peroxide is added. The temperature is increased to 190° to 200° F. and held there for 2 hours to effect a bleach. The product resulting shows a decided bleaching, but not enough to permit substitution for a white pepper product. There is no substantial loss of bite or flavor. Then, the same dosage of benzoyl peroxide is repeated, making a total 6% addition, and the temperature maintained at 190° to 200° F. for another two hours. The bleaching thus effected is a sufficient one to form a light green product, and there is no effective loss of flavoring power.

Procedure B

The Procedure A may be varied by adding the 6% of benzoyl peroxide all at once, for example at 170° F., and the reaction carried out by holding at a heat of 190° to 200° F. for 2 hours. The results are likewise satisfactory as to the bleaching and the lack of loss in flavoring power in both aroma and bite.

The temperature effect in this procedure is indicated by the fact that if the temperature is raised to 250° F. a perfectly white product may be obtained, but with a sacrifice of flavor. The product of this higher temperature becomes more like a bland oil of pepper with a moderate bite. It is thus indicated that the end point of the bleaching must be balanced against the character of the product.

Another modification in glass reflux apparatus using relatively small quantities of oleoresin of (red) capsicum, mixed cold with 2% of benzoyl peroxide, heated to 194° F. within ½ hour, and there held for one hour gives a well bleached oleoresin, without substantial loss of flavor. The product, mixed in the proportion of 1 part with 80 parts of sugar powder appears white. Under the same conditions, where only 1% of benzoyl peroxide is used, the color of the product on sugar is a yellowish white. It follows then that where the product is diluted, as by being placed on a white vehicle like sugar, the satisfactory color of the new mixture may determine the extent to which the bleaching need be carried.

In further illustration under Procedure B it can be shown that the end color depends not only on the per cent of bleaching agent used, but also on the unidentified but individual characteristics of the various commercial brands of the oleoresins. One particular brand of oleoresin known as a commercial "light", at 2% benzoyl peroxide, gives a less light color than an oleoresin from a different source, being a light creamish white, which product on emulsification in water gives a tan colored emulsion. A certain standard oleoresin of capsicum at 2% benzoyl peroxide gives a light reddish tan in the bleached oleoresin.

Commercial procedure C

In the foregoing the use of glass reflux apparatus and small batches has been purposely named, because in larger batches in a commercial autoclave with constant agitation, even better results are obtained. From experiments in the nature of Procedures A and B, it can be found, for example, that 6% benzoyl peroxide gives a real white product, accompanied by about 60% depreciation in bite. In the commercial procedure this result is not confirmed, and the bleaching can go to a high degree of white without such a substantial loss of bite or loss of flavor. This is no doubt due to the fact that constant agitation prevents local overaction wherein the flavoring materials are destroyed.

A satisfactory commercial process permits use of 6% benzoyl peroxide, added at 160° F. while the pepper base is being heated to 190° to 200° F. to be held at that range for a two hour reaction.

Discussion of process

Benzoyl peroxide melts at about 104° C. or 220° F., but in admixture with oleoresin of capsicum, which is fluid, it dissolves at a temperature below its melting point, and near 190° F.

The organic peroxides of this type are preferred because the decomposition thereof is one of an active form of oxygen breaking away, leaving an organic residue. The formula of benzoyl peroxide is

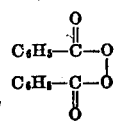

and the active part lost is the group —O—O—. The radical —CO—O—O—OC— is a typical grouping which may occur in other peroxides having other radicals corresponding to the phenyl radicals $C_6H_5$— of benzoyl peroxide. Although benzoyl peroxide (known also as dibenzoyl peroxide) has duplicate radicals in the phenyl form, this identity of radicals is by no means necessary. One molecule of benzoyl peroxide yields two molecules of benzoic acid. There are other peroxides which give good results. For example there is acetyl peroxide, which yields acetic acid. This, like benzoic acid, as end product is a permissible residue for a food ingredient. There is the peroxide with one phenyl group or radical and with one methyl group, known as acetyl benzoyl peroxide, which yields both acetic acid and benzoic acid. This also may be used.

The product

The bleached oleoresin of the reactions preferred may be cooled and used directly from the autoclave without further treatment. The benzoic acid by-product in particular of the preferred reaction is not injurious to the product, and to some extent its food preservative value is active, and held in reserve for exercise in food products which may ultimately be flavored. The oleoresin may be made up into emulsions, or spread on diluents like sugar or salt, starch, milk powder, or various mixtures of vehicles with or without other substances.

Commercial compositions

Bleached pepper-base material, especially in concentrated oleoresin form, is useful in commerce in emulsions and in dry-seasonings for compounding sausage and like products.

Formula I

| Bleached oleoresin of red capsicum | ounces | 3.75 |
|---|---|---|
| Oil of sage | do | 5 |
| Oil of pepper | ounce | 1 |
| Oil of nutmeg | do | 0.25 |
| Coconut oil | ounces | 4 |
| Corn sugar | pounds | 16 |

Formula II

Bleached oleoresin of black pepper 5.5 ounces is substituted for the 3.75 ounces of bleached oleoresin of (red) capsicum base in Formula I. It is preferably ground with the sugar to work into a smooth mixture.

Formula III

| Bleached oleoresin of (red) capsicum | ounces | 7.5 |
|---|---|---|
| Bleached oleoresin of black pepper | ounce | 1 |
| Oil of pepper | do | 1 |
| Oleoresin of ginger | do | 1/8 |
| Sodium chloride | pounds | 16 |

(The same quantity of sugar, or mixed salt and sugar may be used as the vehicular base in place of the sodium chloride specified.)

Formula IV

| Bleached oleoresin of capsicum | ounces | 3.25 |
|---|---|---|
| Oil of sage | do | 3 |
| Oil of thyme | ounce | 0.25 |
| Oil of ginger | do | 0.25 |
| Sugar, (salt, or mixed sugar and salt) | pounds | 16 |

Such compositions, and the emulsion type are well known. The importance, however, of the invention, is emphasized in such compositions, because the strength of the ingredients determines the ratio in which the composition is used, compared to the quantity of natural pepper fibers for the same unit values. The stronger the oleoresin in a sugar or salt base vehicle, the less one needs to use, hence less sugar or less salt. The white or light color is desired to avoid the darkening or reddening of the product obtained. This may be a fancy of the trade, but nevertheless it is a situation which must be met by those producers of seasonings who compete on strength and cost bases. Therefore, the ability to bleach has a high commercial importance.

I claim:

1. The method of bleaching a viscous or semi-solid oleoresin of pepper which comprises mixing directly therewith an organic peroxide in the absence of other material to dissolve the oleoresin, heating the mixture to a temperature sufficient to effect solution of the peroxide in the oleoresin, continuing the heat until the desired bleaching action has taken place, and cooling the mass.

2. The method of bleaching a viscous or semi-solid oleoresin of pepper which comprises mixing directly therewith a solid organic derivative of hydrogen peroxide in the absence of other material to dissolve the oleoresin, heating the mixture to a temperature sufficient to effect solution of the peroxide in the oleoresin, continuing the heat until the desired bleaching action has taken place, and cooling the mass.

3. The method of bleaching a viscous or semi-solid oleoresin of pepper which comprises mixing directly therewith benzoyl peroxide in the absence of other material to dissolve the oleoresin, heating the mixture to a temperature sufficient to effect solution of the peroxide in the oleoresin, continuing the heat until the desired bleaching action has taken place, and cooling the mass.

4. The method of bleaching a viscous or semi-solid oleoresin of pepper which comprises mixing directly therewith up to 6% of benzoyl peroxide in the absence of other agent to dissolve the oleoresin, agitating the mixture to avoid local action, and heating the mass substantially in the range of from 190° F. to 200° F. until the desired bleaching action has been obtained.

5. The method of bleaching a viscous or solid oleoresin of pepper which consists of dissolving up to about 6% of a solid organic peroxide in the oleoresin at a temperature below the melting point of the peroxide, and maintaining the solution until the desired degree of bleaching is obtained.

6. The method of bleaching a viscous or solid oleoresin of pepper which consists of agitating a mixture of the oleoresin and up to 6% of a solid organic peroxide, heating the agitated mixture until the peroxide dissolves in the oleoresin, and maintaining the solution until the desired degree of bleaching is effected.

LLOYD A. HALL.